US006945107B2

(12) United States Patent
Tanaka et al.

(10) Patent No.: US 6,945,107 B2
(45) Date of Patent: Sep. 20, 2005

(54) FLOW RATE DETECTION DEVICE AND METHOD FOR MANUFACTURING THE SAME

(75) Inventors: Masaaki Tanaka, Kariya (JP); Toshiya Ikezawa, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/974,856

(22) Filed: Oct. 28, 2004

(65) Prior Publication Data

US 2005/0120790 A1 Jun. 9, 2005

(30) Foreign Application Priority Data

Dec. 9, 2003 (JP) ...................................... 2003-410909

(51) Int. Cl.[7] ................................................ G01F 1/68
(52) U.S. Cl. .................................................. 73/204.26
(58) Field of Search ......................... 73/204.22, 204.24, 73/204.26, 204.11, 204.19

(56) References Cited

U.S. PATENT DOCUMENTS 6,591,675 B1 * 7/2003 Doderer et al. .......... 73/204.22
6,789,418 B2 * 9/2004 Uramachi et al. ....... 73/204.22

FOREIGN PATENT DOCUMENTS

JP A-2000-2572 1/2000

* cited by examiner

*Primary Examiner*—Edward Lefkowitz
*Assistant Examiner*—Jewel V. Thompson
(74) *Attorney, Agent, or Firm*—Posz Law Group, PLC

(57) ABSTRACT

A flow rate detection device has a flow rate detection chip that is partially exposed to the flowing material to be measured and a casing that accommodates the flow rate detection chip. The casing has a bottom plate portion on which the flow rate detection chip is mounted, and a top plate portion that is disposed over the bottom plate portion and partially covers the flow rate detection chip. The space between the bottom plate portion and the top plate portion is filled with a sealant.

11 Claims, 4 Drawing Sheets

FLOW RATE DETECTION DEVICE AND METHOD FOR MANUFACTURING THE SAME

CROSS REFERENCE TO RELATED APPLICATION

This application is based on and incorporates herein by reference Japanese Patent Application No. 2003-410909 filed on Dec. 9, 2003.

FIELD OF THE INVENTION

The present invention relates to a flow rate detection device that measures an air flow rate and a method of manufacturing the device.

BACKGROUND OF THE INVENTION

A conventional flow rate detection device that measures flow rate of fluid is disclosed, for example, in patent document JP-A-2000-2572.

FIG. 4A shows a schematic cross-sectional view of a conventional flow rate detection device 90. FIG. 4B shows an installation condition of the flow rate detection device 90. In this case, orientation of the flow rate detection device 90 is reversed in FIG. 4A and in FIG. 4B.

The flow rate detection device 90 shown in FIGS. 4A and 4B is an air flow meter, and the device measures a flow of air moving perpendicular to the plane defined by this document in a tubular space on the right side of the chain line 4A—4A in FIG. 4A.

As shown in FIG. 4A, the flow rate detection device 90 has a flow rate detection chip 91 that is partially exposed to the flowing material to be measured, such as air, and a casing that houses the flow rate detection chip 91. The flow rate detection chip 91 is composed of a silicon semiconductor substrate that has a thin film portion (membrane) 91 etched for thinning down from the other side of the substrate and a heater portion formed on the membrane 1 m. The flow rate detection chip 91 is mounted on a bottom plate portion 92*a* of a casing 92, and a circuit chip 4 that has a circuit element for controlling input/output of the flow rate detection chip 91 is also mounted on the same bottom plate portion 92*a*. The flow rate detection chip 91 and the circuit chip 4 are electrically connected to each other by bonding wires 5. The bonding wires 5 and the circuit chip 4 are covered by a sealant 3 to protect bonding wires from short-circuit and to protect the circuit element from surrounding the atmosphere.

The flow rate detection device 90 shown in FIG. 4A guides flow of air over the heater portion 1*h* of the flow rate detection chip 91. The heat dissipation rate of the heater portion 1*h* changes according to the flow of air. Thus, change of heat dissipation is detected as a change of resistance of the heater portion 1*h* and processed value in the circuit chip 4 can be used as an air flow measurement.

As described above, the flow rate detection device 90 shown in FIG. 4A has to have the membrane 1*m* and the heater portion 1*h* exposed in the air for taking measurement. The circuit chip 4, bonding wires 5, and connecting portion of the bonding wires 5 on the flow rate detection chip 91 have to be covered by the sealant 3. If the sealant 3 covers the heater portion 1*h* of the flow rate detection chip 91, flow rate sensitivity will be affected because of the decrease of heat dissipation at the heater portion 1*h*. To avoid the above situation, the flow rate detection device 90 has a stopper portion 92*t* that separates the membrane 1*m* and the heater portion 1*h* from the connecting portion of the bonding wires 5. This stopper portion 92*t* protects the membrane 1*m* and the heater portion 1*h* from overflow of the sealant 3 when the sealant 3 is poured into a target portion.

The stopper portion 92*t* of the flow rate detection device 90 in FIG. 4A, has to be located more than 3 mm apart from the heater portion 1*h* in order to not cause turbulent air flow. In this case, the portion located under the stopper portion 92*t* in the flow rate detection chip 91 is used only to support the stopper portion 92*t*. That is, the size of the flow rate detection chip 91 is enlarged by the width of the stopper portion 92*t*. As a result, the number of flow rate detection chips 91 that can be diced from a single silicon wafer decreases, and the cost of manufacturing increases accordingly.

SUMMARY OF THE INVENTION

In view of the forgoing problem, a concern of the present disclosure is to miniaturize the flow rate detection chip and reduce cost associated with a method of manufacturing the flow rate detection device.

According to a first aspect, a flow rate detection device has a flow rate detection chip that is partially exposed to a flowing material to be measured and a casing that houses the flow rate detection chip. The casing includes a bottom plate portion that has the flow rate detection chip on board and a top plate portion that hangs over the bottom plate portion partially covering the flow rate detection chip. A space between the bottom plate portion and the top plate portion is filled with a sealant.

Gel thermosetting resin or the like may be used to implement the sealing material (sealant) for the electric devices. For example, fluorine gel or the like flows into the target space because of its liquidity. The material loses its liquidity when it is dried. Therefore, once the sealant is dried, it will not leak from the target space, and the stopper portion to control the spill of sealant required to be included is unnecessary.

In the flow rate detection device, the space between the bottom plate portion for the flow rate detection chip and the top plate portion that hangs above the bottom plate portion to partially cover the flow rate detection chip is filled with the sealant. This structure makes it possible to expose the required part of the flow rate detection chip to the flowing material to be measured and, at the same time, to omit a sealant stopper portion of the conventional flow rate detection device. As a result, the space for the sealant stopper portion can be eliminated and the package of the flow rate detection chip can be made smaller. Therefore, the number of flow rate detection chips that can be diced from a single silicon wafer will be increased and thus the flow rate detection device can be inexpensively made.

According to a second aspect, the casing of the flow rate detection device has a U-shaped sidewall between the bottom plate portion and the top plate portion, the sealant fills the area surrounded by the casing and the top plate portion and the bottom plate portion, and the flow rate detection chip is partially protruding in the flowing material to be measured.

The sealant can be poured into the space and can then be held stably when the shape of the casing is structured in the above-described manner.

According to a third aspect, the bottom plate portion and the top plate portion of the flow rate detection device are preferably formed as a single-piece. By adopting this structure, the sealant can be stably used and the casing can be made inexpensively.

According to a fourth aspect, the flow rate detection chip of the flow rate detection device has a flow rate detection element portion formed at its end that is exposed to the flowing material to be measured, and the flow rate detection chip is preferably covered by the sealant except for the flow rate detection element portion.

This structure enables that only the flow rate detection element portion formed at the end of the flow rate detection chip is exposed to the flowing material to be measured and the other portion is covered by the sealant. Therefore, the area except for the detection element portion is covered by the surrounding atmosphere and a short-circuit is prevented from occurring.

According to a fifth aspect, the flow rate detection chip is composed of a silicon semiconductor substrate, and the flow rate detection element portion preferably has a membrane portion formed on the silicon semiconductor substrate and a heater portion formed on the membrane portion.

The membrane portion can easily be made by etching from the other side of the silicon semiconductor substrate. The heater formed on the substrate can be used as a high-sensitivity flow rate detection element. Therefore, the flow rate detection device can be made small and highly sensitive, and at the same time inexpensive.

According to a sixth aspect, a pad portion of the flow rate detection device for input/output connection is formed at the opposite end of the flow rate detection element portion of the flow rate detection chip, and the pad portion has a connection of bonding wires, and the pad portion and the bonding wires are preferably covered with the sealant. This structure prevent short-circuit between the pad portion of the flow rate detection chip and the bonding wires.

According to a seventh aspect, a circuit chip with a circuit element is mounted on the bottom plate portion. The circuit chip has the pad portion for input/output connection. The pad portion has a connection of bonding wires. Preferably, both the circuit chip and the bonding wires are covered with sealant. This construction provides the circuit chip with protection from the surrounding atmosphere and prevents a short-circuit from occurring between the pad portion of the circuit chip and the bonding wires.

According to an eighth aspect, a circuit substrate is mounted on the bottom plate portion, and the circuit substrate has the pad portion for input/output connection, and the pad portion has a connection of bonding wires, and the circuit substrate and the bonding wires are preferably covered with the sealant. This construction provides the circuit substrate a protection from surrounding atmosphere and prevents a short-circuit from occurring between the pad portion of the circuit substrate and the bonding wires.

According to a ninth aspect, lead pins for input/output connection are inserted between the top plate portion and the bottom plate portion, and the lead pins have a connection of bonding wires, and the lead pins and the bonding wires are preferably covered with the sealant between the bottom plate portion and the top plate portion. This structure provides prevents a short-circuit from occurring between the lead pins and the bonding wires.

According to a tenth aspect, the sealant in the flow rate detection device is preferably made of a gel. The gel sealant has a good sealing performance and has liquidity when poured and loses liquidity when dried. Therefore, as described above, the stopper portion of the conventional flow rate detection device can be eliminated and the device can be made small, inexpensive and environment resistant.

According to an eleventh aspect, the flow rate detection device is suitable for an air flow censor that the flowing material to be measured is an air. In the air flow sensor, the air is mixed with vapor. The structure described above can protect short-circuit with vapor or the like by sealing with a sealant 3. This will result in a small, inexpensive and environmentally resistant flow rate detection device.

According to a twelfth aspect, a novel methodology for forming the flow rate detection device comprised of a flow rate detection chip that is partially exposed to a flowing material to be measured, a casing that houses the flow rate detection chip, and a sealant that covers part of the flow rate detection chip is disclosed. That is, the casing includes a bottom plate portion that has the flow rate detection chip on board and a top plate portion on top of the bottom plate portion that partially covers the flow rate detection chip, and the casing has a U-shaped side wall between the bottom plate portion and the top plate portion, and the sealant is poured from the opening portion of the U-shaped sidewall, and the sealant fills the area surrounded by the casing and the top plate portion and the bottom plate portion. The sealant can be stably poured into the area that is formed by the bottom plate portion, the top plate portion, and the sidewall portion, when the opening of the U-shaped sidewall portion is held upward. This structure facilitates the ease of manufacturing of the flow rate detection device and decreases the cost of manufacturing.

For the clarification of the orientation, the 'top' and the 'bottom' plate here means the top/bottom plate in FIG. 1C. In other word, when the sealant is poured into the target space, the casing is held to 90 degree rotated, that is, the 'top' and the 'bottom' plate portion are both standing up rather than lying horizontally, to accept the sealant.

According to a thirteenth aspect, the bottom plate portion and the top plate portion are formed as a single-piece, and the flow rate detecting chip is mounted at a specified position on the bottom plate portion. The top plate portion is disposed at a specified position to partially cover the flow rate detecting chip, and then the sealant preferably fills the area surrounded by the casing and the top plate portion and the bottom plate portion.

By taking the steps described above, placement of the flow rate detection chip relative to the bottom plate portion and placement of the top plate portion relative to the flow rate detection chip can be easily achieved. This method facilitates the ease of manufacturing of the flow rate detection device and decreases the cost of manufacturing.

According to a fourteenth aspect, the sealant is preferably made of a gel. The gel sealant is easy to handle because of its liquidity, and the loss of liquidity when it is dried. This material facilitates the ease of manufacturing of the flow rate detection device and decreases the cost of manufacturing.

BRIEF DESCRIPTION OF THE DRAWINGS

The above and other objects, features and advantages of the present invention will become more apparent from the following detailed description made with reference to the accompanying drawings.

DETAILED DESCRIPTION OF THE PREFERRED EMBODIMENT

An embodiment of the flow rate detection device according to the present invention will be described based on the drawings.

Figure 1A:
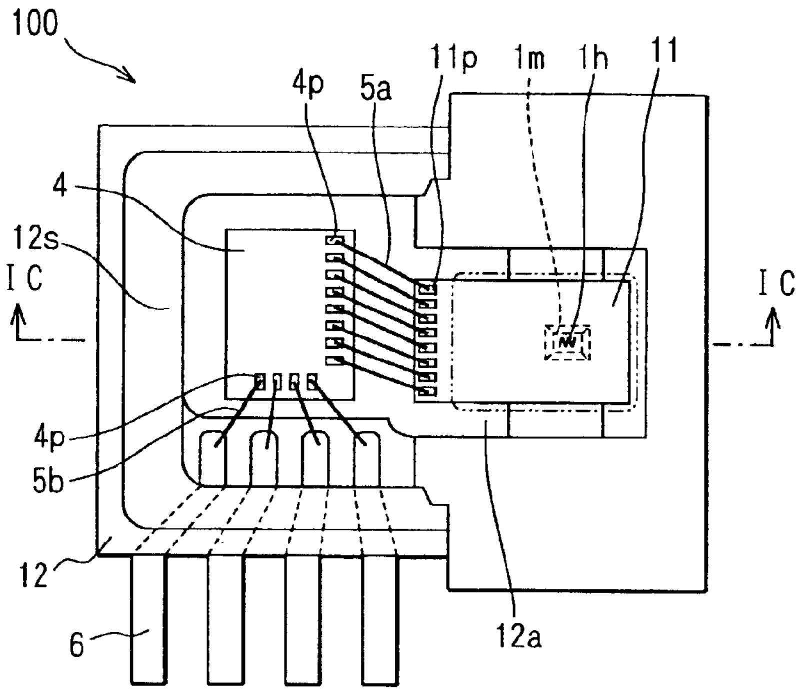
FIG. 1A is an illustration of a top view of a flow rate detection device.
Figure 1B:
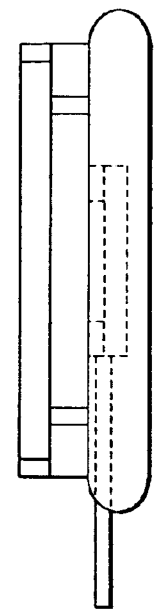
FIG. 1B is an illustration a side view of the device.
Figure 1C:
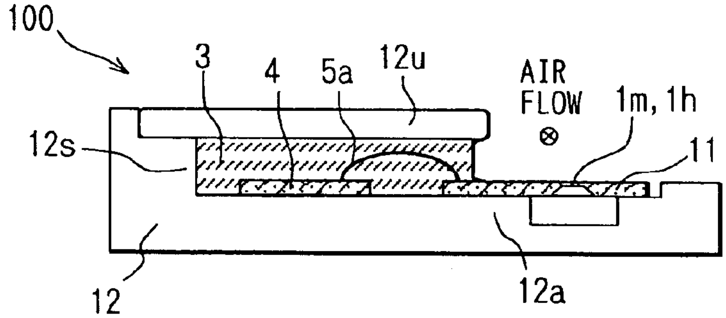
FIG. 1C is an illustration of a cross-sectional view of the device along line IC—IC of FIG. 1A.

Referring to FIGS. 1A–1C, the flow rate detection device 100 will be discussed. The illustration of the flow rate detection device 100 in FIGS. 1A and 1C bears the same numerical sign as the flow rate detection device 90 in FIG. 4A on those parts used by these two cases in common. An installation of the flow rate detection device 100 to the tubular space 80 is the same as shown in FIG. 4B.

The flow rate detection device 100 shown in FIGS. 1A and 1B includes the flow rate detection chip 11 that is partially exposed to airflow and the casing 12 that houses the flow rate detection chip 11. The flow rate detection chip 11 is fixed on a predetermined position on the bottom plate portion 12*a* of the casing 12.

The casing 12 has, as shown in FIG. 1B, the bottom plate portion 12*a* on which the flow rate detection chip 11 is disposed and the top plate portion 12*u* which is hung over the bottom plate portion 12*a* and partially covers the flow rate detection chip 11. Further, a U-shaped sidewall portion 12*s* is disposed between the bottom plate portion 12*a* and the top plate portion 12*u* around the periphery of the top plate portion 12*u*. The bottom plate portion 12*a* and the top plate portion 12*u* are preferably formed as a single-piece so that this part can be produced at an inexpensive cost. The top portion 12*u* is fixed on the upper surface of the sidewall portion 12*s* preferably by using glue after the flow rate detection chip 11 and the like are disposed on it. The above-described structure of the casing 12 makes it easier to stably pour the sealant 3, shown in FIG. 1B, into the area surrounded by the bottom plate portion 12*a*, the top plate portion 12*u* and the sidewall portion 12*s*, and makes it possible to support it after sealing. The top plate portion 12*u* is not shown in FIG. 1A to illustrate the inner part of the device. The flow rate detection device 100 can be made smaller than the conventional flow rate detection device 90 shown in FIG. 4A because the stopper portion 92*t* is not required.

The flow rate detection chip 11 is composed of a silicon semiconductor substrate. In FIG. 1A, the right-most portion of the flow rate detection chip 11 surrounded by the chain double-dashed line is the flow rate detection element portion that is exposed to the flowing material to be measured, that is, airflow. Further, a pad portion 11*p* for input/output connection is disposed on the opposite side of the flow rate detection element portion, or the left-most portion. The flow rate detection element portion has a thin membrane 1*m* and a heater portion 1*h* formed on the membrane 1*m*. The silicon semiconductor substrate is simply etched from the other side to form a thin membrane 1*m*, and the heater portion 1*h* on the membrane 1*m* can be a flow rate detection element of high sensitivity, as later described. Therefore, the flow rate detection device 100, having a small and highly sensitive flow rate detection chip 11 on it, can be manufactured inexpensively.

Figure 4A:
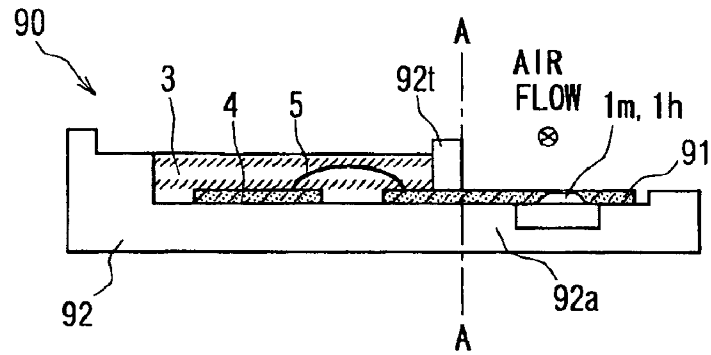
FIG. 4A is an illustration of a cross-sectional view of a conventional flowmeter.
Figure 4B:
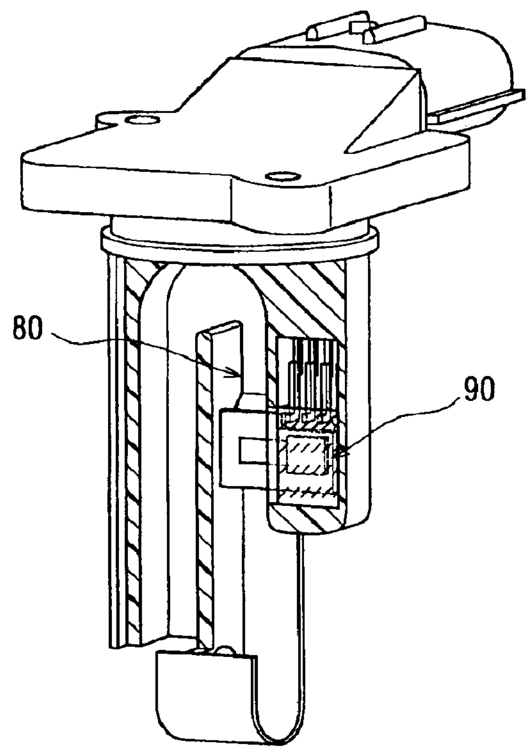
FIG. 4B is an illustration of an installation condition of the flow rate detection device.

The flow rate detection device 100 shown in FIGS. 1A, 1B and 1C can measure airflow in the tubular space 80 shown in FIG. 4B that is perpendicular to the surface of this document/drawing in the same manner as the flow rate detection device 90 shown in FIGS. 4A and 4B.

Figure 2:
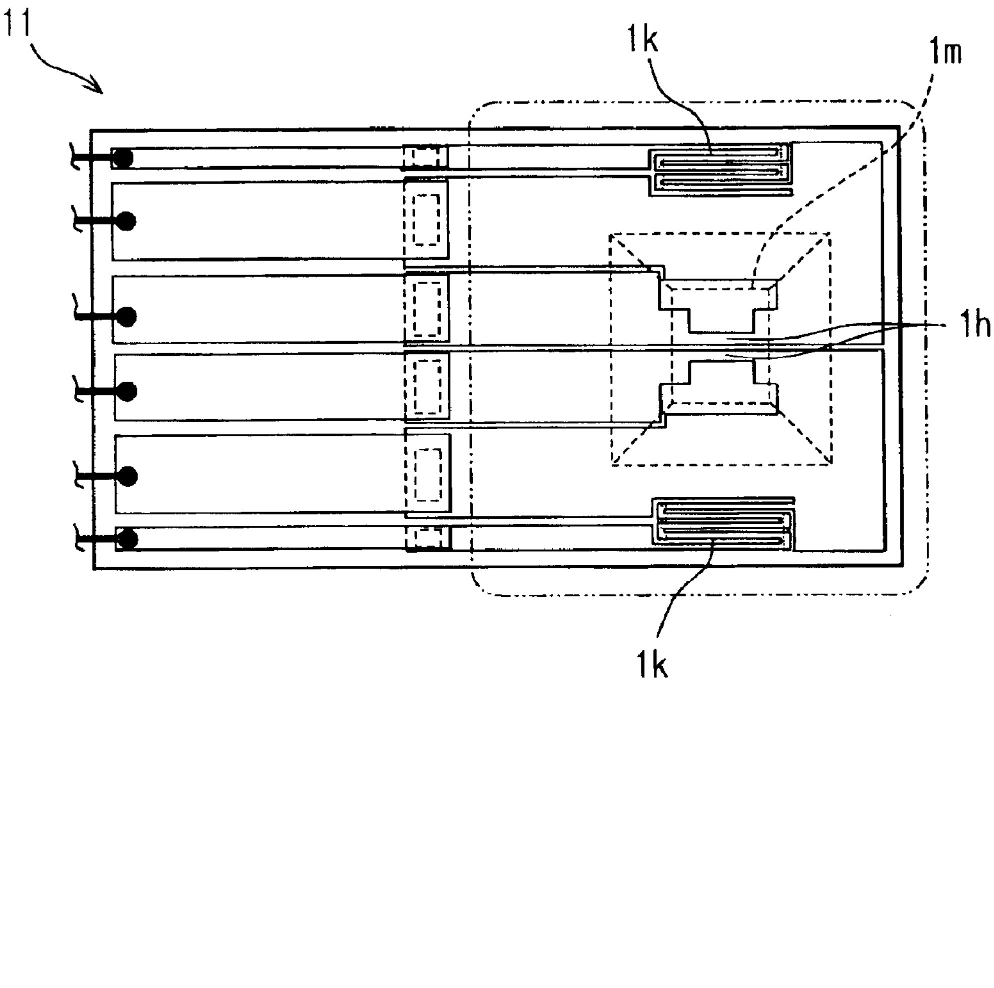
FIG. 2 is an illustration of a top view of the flow rate detection chip.

FIG. 2 shows a top view of a detailed schematic structure of the flow rate detection chip 11.

The thin membrane 1*m* of the flow rate detection chip 11 shown in FIG. 2 is thinly formed in comparison to the other part of the chip 11, thus isolated thermally from the other part of the chip 11 with its low heat capacity. A pair of heaters 1*h* is formed on the thin membrane 1*m*. Further, the pair of heaters 1*h* are sandwiched between a pair of heat sensing portions 1*k* that pick up air temperature. The heat sensing portions 1*k* are formed on the upper stream side and the lower stream side of air flow direction based on the location of the heaters 1*h*.

In the flow rate detection device 100 as shown in FIGS. 1A, 1B and 1C, heat dissipation rate of the heater 1*h* in the flow rate detection chip 11 changes when airflow passes over the heater 1*h*. This change is picked up as a change of resistance in the heater 1*h*, and the resistance value is processed by the circuit chip 4 to yield a measurement of flow of air.

Referring to FIG. 2, the operation of the flow rate detection device 100 will be discussed in more detailed. The heater 1*h* has a function of self-temperature detection based on the resistance-temperature correlation coefficient in addition to a heating function driven by electricity. The flow rate of air is detected by the amount of heat deprived by the flow of air from the heaters 1*h* located in an upper air stream and a lower air stream. Further, flowing direction of air is detected based on a difference of heat amount deprived by the air from each of the heaters 1*h* on the upper stream side and the lower stream side. Furthermore, difference of temperature between heater 1*h* and heat sensing portion 1*k* on the upper stream side, and difference of temperature between heater 1*h* and heat sensing portion 1*k* on the lower stream side are both utilized to control the amount of electric currency provided to each of the heaters 1*h*.

As shown in FIGS. 1A, 1B and 1C, the flow rate detection chip 11 is fixed to the bottom plate portion 12*a* of the casing 12, and the circuit chip 4 that has a circuit element to control input/output of the flow rate detection chip 11 is also fixed to the same bottom plate portion 12*a*. The circuit chip 4 is fixed to the bottom plate portion 12*a* of the casing 12 preferably by using glue in the same manner as the flow rate detection chip 11. The circuit chip 4 has a pad portion 4*p* formed for external input/output connection. Pad portion 11*p* of the flow rate detection chip 11 and pad portion 4*p* of the circuit chip 4 are electrically connected to each other by bonding wires 5*a*. Lead pins 6 are disposed between the bottom plate portion 12*a* and the top plate portion 12*u* for external input/output, and a pad portion 4*p* of the circuit 4 and lead pins 6 are electrically connected to each other by bonding wires 5*b*.

As shown in FIG. 1C, a space between the bottom plate portion 12*a* and the top plate portion 12*u* of the casing 12 is filled with the sealant 3 in the flow rate detection device 100. The sealant 3 may either be made of a gel, a thermoplastic resin, or the like, but the material for the sealant would most preferably be made of gel for a reason described later. The sealant 3 is not shown in FIG. 1A for the purpose of showing an inside view.

The sealant 3 is poured in the space that is surrounded by the bottom plate portion 12*a*, the top plate portion 12*u*, and the sidewall portion 12*s* as shown in FIGS. 1A, 1B and 1C. Therefore, the sealant 3 covers all of the following items between the bottom plate portion 12*a* and the top plate portion 12*u*, except for the flow rate detection element portion of the flow rate detection chip 11 marked by the chain double-dashed rectangle, that is, the lead pins 6, the circuit chip 4, bonding wires 5*a*, 5*b*, and the flow rate detection chip 11. On the other hand, the flow rate detection element portion of the flow rate detection chip 11 enclosed in the chain double-dashed line protrudes from the sealant 3 and is exposed to a flowing material to be measured, or the air. The flow rate detection device 100 exposes only the required part of the flow rate detection chip 11 to the air (fluid to be measured), and covers the other part by the sealant 3 poured in the space between the bottom plate portion 12*a* and the top plate portion 12*u*, that is, the rest of the flow rate detection chip 11, the circuit element on the circuit chip 4, and the bonding wires 5*a*, 5*b*. As a result, those items such as the circuit element, bonding wires 5*a*, 5*b* and the like covered by the sealant 3 will be protected from the surrounding atmosphere and prevented from short-circuiting or the like.

The flow rate detection device 100 shown in FIGS. 1A, 1B and 1C uses a fluorine gel as a sealant 3. The fluorine gel has a good sealing capability. It also has a good liquidity when poured into a target area and loses the liquidity when dried. This characteristics and the following manufacturing method will enable elimination of stopper portion 92*s* in the conventional flow rate detection device 90 shown in FIG. 4A from the flow rate detection device 100 shown in FIGS. 1A and 1B. As a result, the space reserved for the stopper portion 92*s* in the flow rate detection chip 91 can be eliminated, and the size of the flow rate detection chip 11 can be decreased in the flow rate detection device 100 shown in the FIG. 1A and 1B. Therefore, the number of the flow rate detection chips 11 diced from one silicon wafer will be increased. This enables the flow rate detection device 100 shown in FIGS. 1A and 1B to be small and inexpensive yet environmentally resistant. In this case, the distance from the right-most surface of the sealant 3 to the heater 1*h* is reserved more than 3 mm in FIG. 1B, and thus the right-most surface of the sealant 3 will not interfere with the flow of air to be measured.

Figure 3A:
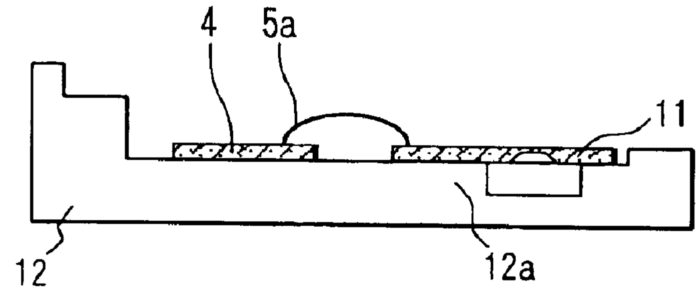
FIGS. 3A–3C are illustrations of a method of manufacturing the flow rate detection device.
Figure 3B:
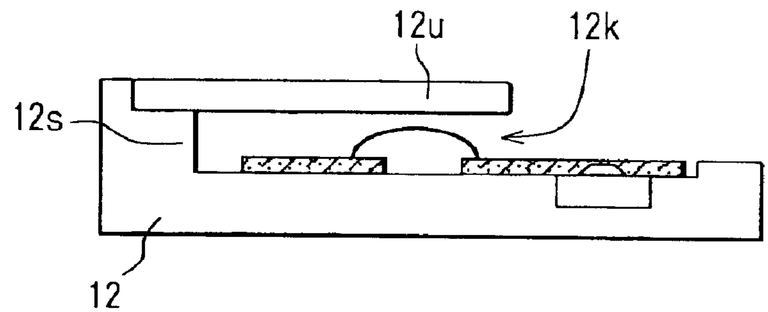
Figure 3C:
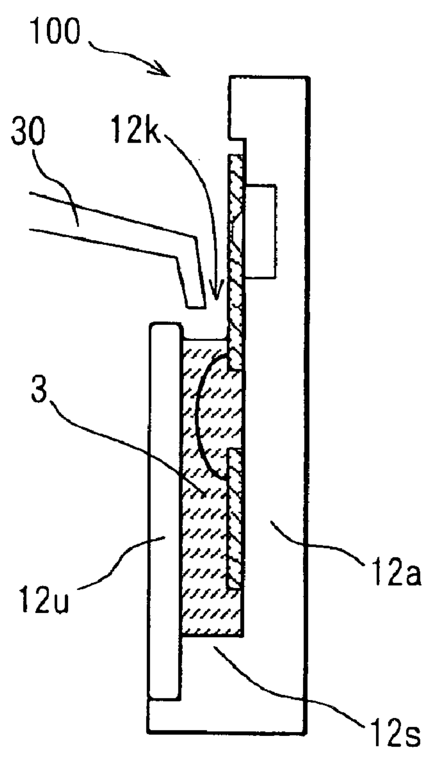

Referring to FIGS. 3A–3C, a manufacturing method of the flow rate detection device 100 shown in FIGS. 1A–1C will be described.

First, the flow rate detection chip 11 and the circuit chip 4 are fixed to be mounted on the bottom plate portion 12*a* of the casing 12. Disposition of the flow rate detection chip 11 and the circuit chip 4 to a predetermined location is easily carried out before the top plate portion 12*u* is installed. Next, the bonding wires 5*a* connect the chip 11 and the chip 4 electrically.

Next, as shown in FIG. 3B, the top plate portion 12*u* is placed on a predetermined position of the sidewall portion 12*s* to be fixed to it, partially covering the flow rate detection chip 11.

Next, as shown in FIG. 3C, the flow rate detection device 100 is held with an opening 12*k* of the U-shaped sidewall 12*s* facing up, and the sealant 3 of fluorine gel is poured into the opening 12*k* by using a nozzle 30. The space surrounded by the bottom plate portion 12*a*, the top plate portion 12*u* and the sidewall portion 12*s* makes up a pocket shape structure, thus the sealant 3 can be stably poured from the opening 12*k*. The sealant is poured up to the surface of the opening 12*k* so that the space surrounded by the bottom plate portion 12*a*, the top plate portion 12*u* and the sidewall portion 12*s* will be completely sealed. The sealant 3 made up of gel loses its liquidity when dried, while it is easily handled in a liquid shape when it is poured. Therefore, the sealant 3 will not flow out from the pocket structure once it is completely dried, even if the flow rate detection device 100 is held in an arbitrary angle.

According to the manufacturing method described above, the stopper portion 92*s* in the conventional flow rate detection device 90 shown in FIG. 4A can be eliminated when manufacturing the flow rate detection device 100 with ease. This leads to the reduction of manufacturing cost.

(Other Embodiment)

The flow rate detection device 100 shown in FIGS. 1A, 1B and 1C uses the casing 12 that has the bottom plate portion 12*a* and the sidewall portion 12*s* made in a single-piece structure. The sidewall 12*s* may be made separately from the bottom plate portion 12*a*. In addition, the sidewall 12*s* may be removed after the sealant 3 is poured and dried.

The flow rate detection device 100 shown in FIGS. 1A, 1B and 1C uses the flow rate detection chip 11 that has a thin membrane 1*m* and the heater 1*h*. The flow rate detection chip can be any chip that has a certain flow rate detection element formed on it.

The flow rate detection device 100 shown in FIGS. 1A, 1B and 1C holds the flow rate detection chip 11 and the circuit chip 4 on the bottom plate portion 12*a* of the casing 12. The flow rate detection chip 11 and a circuit substrate may be disposed together on the bottom plate portion 12*a*, or the pad portion 11*p* of the flow rate detection chip 11 and the pad portion of the circuit substrate may be connected by bonding wires. The flow rate detection chip 11 may be disposed on a circuit substrate, and the circuit substrate together with the flow rate detection chip 11 may be mounted on the bottom plate portion 12*a*.

The flow rate detection device 100 shown in FIGS. 1A, 1B and 1C uses the fluorine gel as the sealant 3. The material for the sealant 3 may be any gel with the characteristics of sealing performance and solidification after exposed to the air. The material may be a thermoplastic resin, a thermosetting resin, an adhesive, or the like.

The flow rate detection device 100 shown in FIGS. 1A, 1B and 1C assumes, as the flowing material to be measured, airflow (air flow sensor). An air flow sensor has air with a mixed vapor in it. The flow rate detection device 100 shown in FIGS. 1A, 1B protects short-circuiting with vapor or the like by the above-described structure of sealing with a sealant 3. This will result in a small, inexpensive and environmentally resistant flow rate detection device. The flow rate detection device 100 shown in FIGS. 1A and 1B is suitable for an air flow sensor, but the material to be measured may be other than the air.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A flow rate detection device comprising:

a flow rate detection chip that is partially exposed to a flowing material to be measured; and a casing that houses the flow rate detection chip, wherein the casing includes a bottom plate portion that has the flow rate detection chip on board and a top plate portion that hangs over the bottom plate portion partially covering the flow rate detection chip, wherein a space between the bottom plate portion and the top plate portion is filled with a sealant.

2. The flow rate detection device of claim 1, wherein the casing has a U-shaped sidewall between the bottom plate portion and the top plate portion, and the sealant fills the area surrounded by the casing and the top plate portion and the bottom plate portion, and the flow rate detection chip is partially protruding in the flowing material to be measured.

3. The flow rate detection device of claim 1, wherein the bottom plate portion and the top plate portion are formed as a single-piece.

4. The flow rate detection device of claim 1, wherein the flow rate detection chip has a flow rate detection element portion formed at its end that is exposed to the flowing material to be measured, and the flow rate detection chip is covered by the sealant except for the flow rate detection element portion.

5. The flow rate detection device of claim 4, wherein the flow rate detection chip is comprised of a silicon semiconductor substrate, and the flow rate detection element portion has a membrane portion formed on the silicon semiconductor substrate and a heater portion formed on the membrane portion.

6. The flow rate detection device of claim 4, wherein a pad portion for input/output connection is formed at the opposite end of the flow rate detection element portion of the flow rate detection chip, and the pad portion has a connection of bonding wires, and the pad portion and the bonding wires are covered with the sealant.

7. The flow rate detection device of claim 1, wherein a circuit chip with a circuit element is mounted on the bottom plate portion, the circuit chip having the pad portion for input/output connection, and the pad portion has a connection of bonding wires, and the circuit chip and the bonding wires are covered with the sealant.

8. The flow rate detection device of claim 1, wherein a circuit substrate is mounted on the bottom plate portion, the circuit substrate having the pad portion for input/output connection, and the pad portion has a connection of bonding wires, and the circuit substrate and the bonding wires are covered with the sealant.

9. The flow rate detection device of claim 1, wherein lead pins for input/output connection are inserted between the top plate portion and the bottom plate portion, and the lead pins have a connection of bonding wires, and the lead pins and the bonding wires are covered with the sealant between the bottom plate portion and the top plate portion.

10. The flow rate detection device of claim 1, wherein the sealant comprises a gel.

11. The flow rate detection device of claim 1 wherein, the flowing material to be measured is air.

* * * * *